United States Patent [19]

Merkel et al.

[11] Patent Number: 5,194,719
[45] Date of Patent: Mar. 16, 1993

[54] STRENGTHENING AND MOUNTING SLOTTED METAL HONEYCOMB STRUCTURES

[75] Inventors: Gregory A. Merkel, Big Flats; Lawrence S. Rajnik, Corning; David F. Thompson, Painted Post; David S. Weiss, Corning, all of N.Y.

[73] Assignee: Corning Incorporated, Corning, N.Y.

[21] Appl. No.: 868,032

[22] Filed: Apr. 13, 1992

[51] Int. Cl.$^5$ .................. H05B 3/10; F01N 3/10; B01D 53/36
[52] U.S. Cl. .................. 219/552; 219/205; 392/488; 428/116; 60/300; 422/174; 55/DIG. 30
[58] Field of Search ........... 219/542, 541, 552, 553, 219/205–208; 392/502, 347, 379, 485, 486, 488, 490; 422/174, 175, 177, 179, 180, 178; 502/527, 439; 60/300; 423/212 C, 239; 428/116; 55/DIG. 30, 523

[56] References Cited

U.S. PATENT DOCUMENTS

| | | | |
|---|---|---|---|
| 2,884,091 | 4/1959 | Baldwin | 55/500 |
| 2,952,333 | 9/1960 | Bush | 55/500 |
| 3,112,184 | 11/1963 | Hollenbach | 428/116 |
| 3,242,649 | 3/1966 | Rivers | 55/500 |
| 3,444,925 | 5/1969 | Johnson | 428/116 |
| 3,790,654 | 2/1974 | Bagley | 428/116 |
| 4,758,272 | 7/1988 | Pierotti et al. | 75/249 |
| 5,063,029 | 11/1991 | Mizuno | 422/175 |

OTHER PUBLICATIONS

Ser. No. 07/76,889, Filed Sep. 30, 1991.

Primary Examiner—Bruce A. Reynolds
Assistant Examiner—Michael D. Switzer
Attorney, Agent, or Firm—Burton R. Turner; Richard N. Wardell

[57] ABSTRACT

Novel method and structure is disclosed for strengthening and mounting sloted metallic honeycomb structures by positioning rod members within the slots to prevent the slots from closing or deforming, and by utilizing the rod members to precisely engage positionable restraining inserts of an enclosing housing, so as to accurately mount the honeycomb structure within the housing.

18 Claims, 6 Drawing Sheets

STRENGTHENING AND MOUNTING SLOTTED METAL HONEYCOMB STRUCTURES

BACKGROUND OF THE INVENTION

This invention relates to the art of strengthening and mounting thin-walled metal honeycomb structures, such as those that would have utility as a substrate or preheater in controlling emissions from a gasoline or diesel internal combustion engine. Such structures may be formed by extrusion from extrudable particulate metal batch materials which have the property of being able to flow or plastically deform during extrusion, while being able to become sufficiently rigid immediately thereafter so as to maintain their structural integrity, in the manner set forth in U.S. Pat. Nos. 3,790,654 and 4,758,272. Alternatively, the honeycomb structures may be fabricated from thin metal sheets such as by wrapping corrugated and uncorrugated metal sheets into a honeycomb structure as shown in U.S. Pat. Nos. 3,112,184 and 3,444,925. Further, if desired, the honeycomb structures could be made of pleated thin porous sheets of filter material whose layers are interleaved with corrugated or crimped spacers as disclosed in U.S. Pat. Nos. 2,884,091, 2,952,333 and 3,242,649.

The invention particularly relates to the problem of restraining the movement of a heater body within its housing in the direction of gas flow, and to the problem of unwanted heater flexibility when utilized in, and subjected to, the harsh and rigorous conditions experienced in vehicular emissions control systems. When metal honeycombs are utilized in a vehicular exhaust preheater application, the honeycomb is slotted along cell channels to form a serpentine electrical path, which is needed to establish the appropriate resistance for a preheater operation. However, the slotting of the metal honeycomb structure results in a number of detrimental side effects, including unwanted heater flexibility between adjacent portions of the slots. In addition to mechanical flexibility, deformation of the slots due to stresses produced during thermal cycling may cause a closure of the slots, and result in short circuits in the electrical path.

Attempts have been made in the past to remedy the problems that may result from the slotting of honeycomb structures by filling such slots with various materials. For example, high temperature cement (such as disclosed in Brundage et al. U.S. application Ser. No. 07/767,889, filed Sep. 30, 1991, assigned to the assignee of the present application), ceramic plates, and metal spacers coated with insulating coating, have all been tried with varying degrees of success. However, the use of cement, plates or spacers requires the complete filling of the slots, and accordingly a penalty is paid in the form of added mass to the honeycomb, and the disasterous potential of dislodging and loss of slot fillers.

In addition, the precision mounting of a metallic honeycomb structure within an associated housing to restrain excessive movement, particularly in the direction of gas flow, has not been completely satisfactory, due to the variability from piece to piece of each honeycomb structure. Accordingly, it has been virtually impossible to match a honeycomb heater with an enclosing housing, except by custom fitting.

It thus has been an object of the present invention to provide a mounting system which not only functions to strengthen slotted metallic honeycomb structures and thereby eliminate undesirable heater flexibility, but also which does not require the precise matching of the honeycomb heater element with its enclosing housing.

SUMMARY OF THE INVENTION

In its simplist form, the present invention not only sets forth means for, and a method of, strengthening a slotted metal honeycomb structure against undesirable flexibility and deformation, but also method and apparatus for the precision mounting of such a strengthened slotted structure within an enclosing housing Nonconductive rods or wires may be placed in various orientations within the slots of a honeycomb structure to impart additional strength to the honeycomb body and maintain the slots in a separated or open condition so that electrical contact cannot be made between opposite sides thereof. Alternately, a rod or plug may be positioned within a countersunk mouth opening of the slot to not only provide the desired strengthening of the honeycomb body and separation of the sidewalls of the slot, but also to provide a precision mounting means for the metallic honeycomb body within an enclosing housing structure. Thus, a pin extension or plug means not only provides additional mechanical support for the slotted honeycomb structure to inhibit deformation of the slots due to thermal cycling stresses and mechanical vibration, but also provides precision locating capability for accurately mounting the honeycomb structure within an appropriate housing.

DESCRIPTION OF THE PREFERRED EMBODIMENTS

Figure 1:
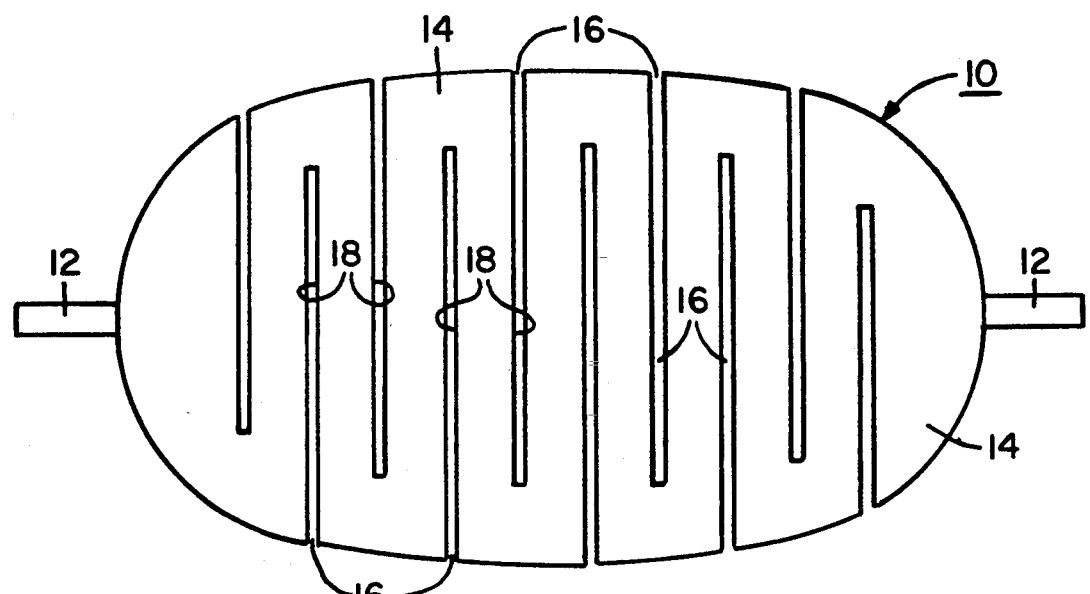
FIG. 1 is a schematic elevational view of a slotted metallic honeycomb structure having utility as a heater in vehicular emissions control.

Referring now to the drawings, and particularly FIG. 1, a slotted metallic honeycomb structure 10 is schematically shown. The structure 10 is shown having a pair of electrodes 12 connected to its opposite ends, such that the honeycomb structure would have utility as, a preheater or heated-substrate for use in vehicular emissions control. The honeycomb structure 10 has a plurality of cells or channels 11 extending from a front face 14 to a back face 15 (shown in FIG. 12), and a plurality of slots 16 are alternately cut into the body of the honeycomb structure 10 from opposite edges, so as to extend from the front face 14 to the back face, thus providing a serpentine path between the electrodes 12 to establish an appropriate resistance for heater operation. It is necessary that the slots 16 remain open during operation, and that the opposed sidewalls 18 of the slots do not come in contact with one another, in order to avoid short circuits in the electrical path between the electrodes 12.

Figure 2:
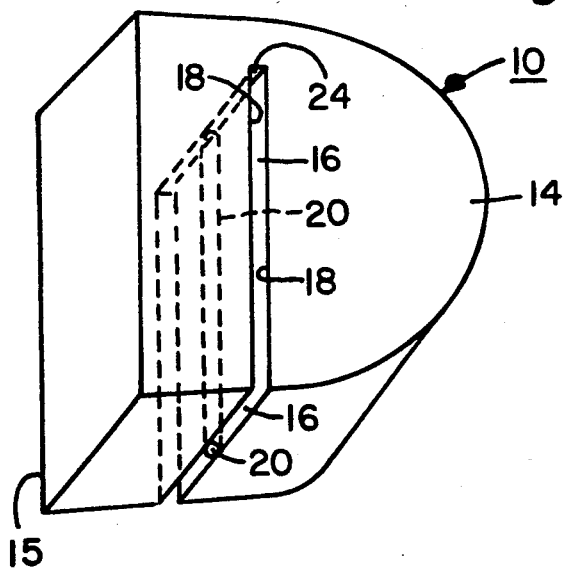
FIG. 2 is a fragmental schematic illustration of one embodiment of the invention.

Referring now to the fragmental schematic representation of a slotted metallic honeycomb structure 10 as shown in FIG. 2, a rod or wire 20, having a diameter equal to the width of the slot opening, is inserted along the length of the slot. The rod 20 functions to impart additional strength to the honeycomb body 10, relative to that of its as-slotted state, and also serves to maintain the slot in an open condition with the sidewalls 18 thereof separated so that electrical contact cannot be made therebetween. In addition, the slot 16 is plugged between the front face 14 and the back face 15 so as to prevent exhaust gas blow-by through the honeycomb structure.

Figure 3:
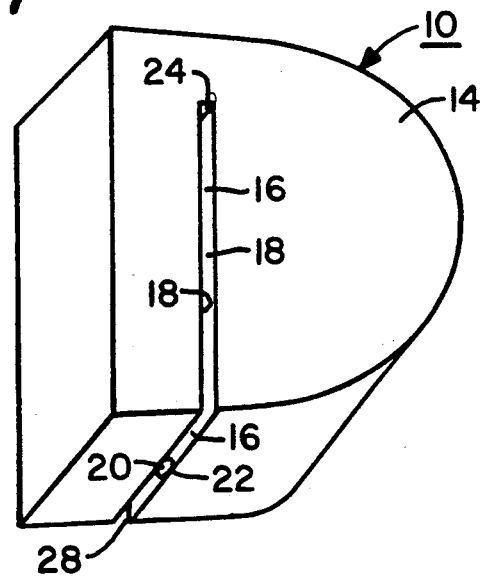
FIG. 3 is a fragmental schematic illustration of a further embodiment of the invention.
Figure 4:
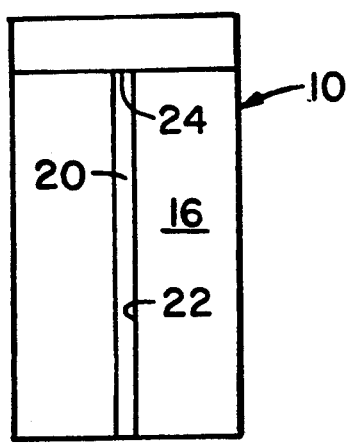
FIG. 4 is a schematic section of FIG. 3.

Referring now to the fragmental schematic illustration shown in FIG. 3 and FIG. 4, a hole 22 of slightly larger diameter than the width of the slot 16 is drilled down the center line of the slot 16 to the slot bottom 24, and an insulating rod 20, having a diameter similar to that of hole 22, is inserted into the hole 22. The rod or wire 20 is held in position by that part of the hole 22 which extends into the metal honeycomb body 10 beyond the slot 16. This configuration functions to block the slot and prevent gas blow-by, to separate the slot and prevent unwanted electrical contact between the sidewalls of the slots, and to provide a mechanical interlocking of the slot sides 18 and prevent differential movement that could result from temperature gradients or vehicular induced vibration.

Figure 5:
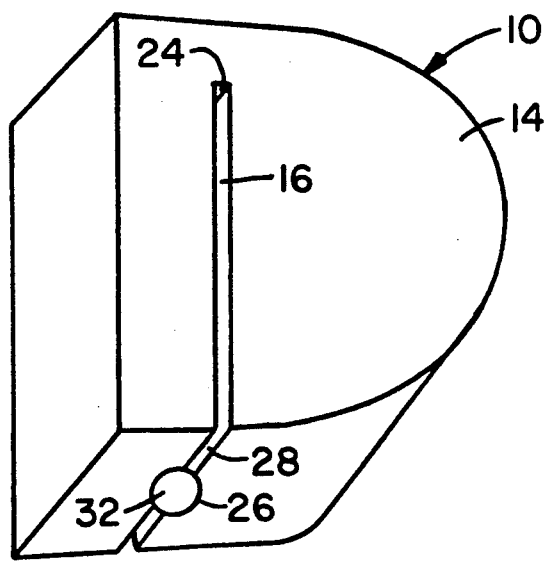
FIG. 5 is a fragmental schematic illustration of a further embodiment of the invention.
Figure 6:
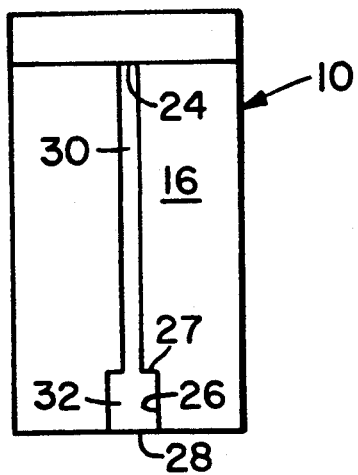
FIG. 6 is a schematic section of FIG. 5.

The embodiment shown schematically in FIGS. 5 and 6 is similar to that as shown in FIG. 2, with the exception that a countersunk cavity 26 may be drilled a given distance into the mouth 28 of the slot 16 to form a shoulder 27 with the slot 16. A spacer rod 30 having a diameter equal to the width of the slot 16, but provided with a larger head 32 of a diameter and depth equal to that of the countersunk cavity, is positioned within the slot 16 and countersunk cavity 26, with the cavity 26 functioning as a guide hole. The spacer rod 30 is held in position by the countersunk guide hole, but has the advantage of not reducing the open frontal area of the honeycomb heater 10 as would a full length rod of larger diameter than the slot width.

Figure 7:
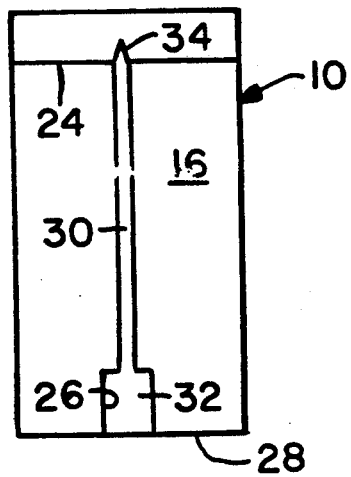
FIG. 7 is a schematic section of a modification of the embodiment shown in FIG. 6.

Reference is now made to the embodiment shown in FIG. 7, which is similar to that shown in FIG. 6, but with the rod 30 being provided with a pointed end 34 which is anchored into the bottom 24 of the slot 16. With the pointed end 34 of the rod 30 being driven into the heater body 10, the spacer rod is anchored within the structure 10, thereby providing greater stability.

Figure 8:
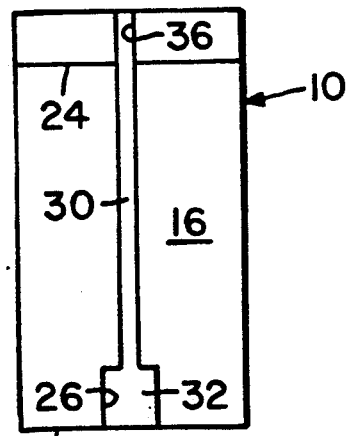
FIG. 8 is a schematic section of a further modification of the embodiment shown in FIG. 6.

Referring now to FIG. 8, a further embodiment is shown wherein a guide hole 36 is drilled through the bottom 24 of the slot 16, and the spacer rod 30 passes completely through the heater body 10 by following the guide hole 36 to the opposite side of the heater from the slot opening 28. In this embodiment, the spacer rod or an extension thereof, can be inserted completely through the heater body, thus providing greater stability to the slotted honeycomb structure.

Figure 9:
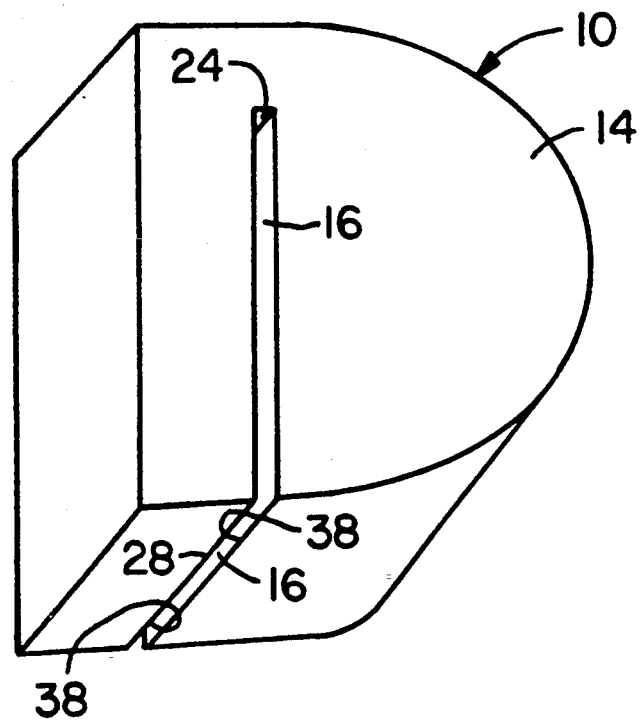
FIG. 9 is a fragmental schematic illustration of an additional embodiment of the invention.
Figure 10:
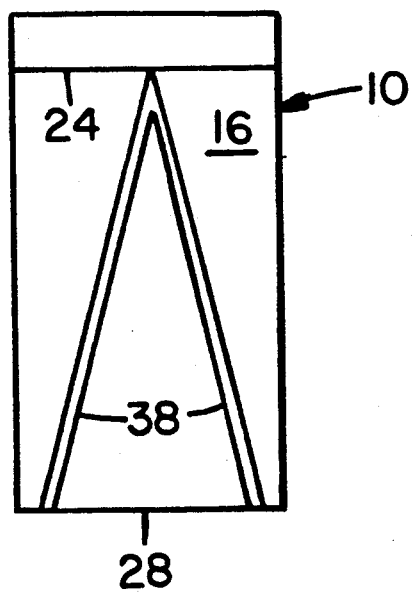
FIG. 10 is a schematic section of FIG. 9.

Referring now to FIGS. 9 and 10, a further embodiment of the invention is shown, similar to FIG. 1, but in place of a wire or rod 20 positioned within the slot 16, a "V" shape spacer 38 is provided, with the "vee" being open toward the outer end or mouth 28 of the slot 16. In this design, there is more support at the outer edge or mouth 28 of slot 16, where electrical shorting would be most detrimental.

The material for the wire or rod spacers 20, 30, 38 can be engineered to suit specific application requirements. Some of the possible materials include ceramic wires or rods such as alumina or zirconia, cermet, semiconductor or other materials having sufficient electrical resistivity to function adequately in the application. In addition metals such as stainless steel wire or rod could be utilized with insulated coatings such as plasma-sprayed ceramic, vitrified or devitrified ceramic coatings, or other materials applied to or grown in situ on the surface.

Figure 11:
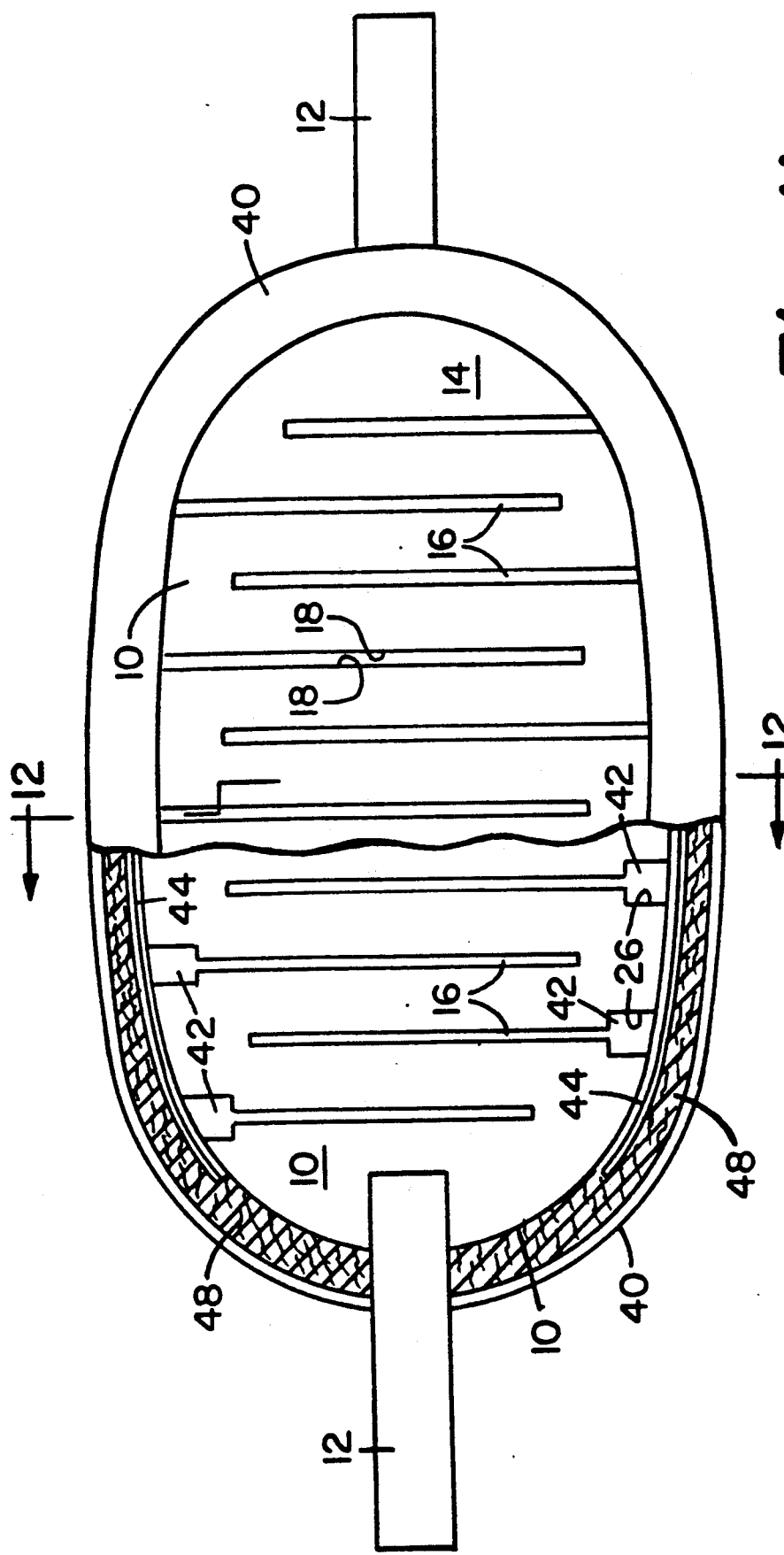
FIG. 11 is a schematic elevational view of a slotted metallic honeycomb preheater body positioned within a housing, with the left-hand portion being cut away as would be seen along line 11—11 of FIG. 12.
Figure 12:
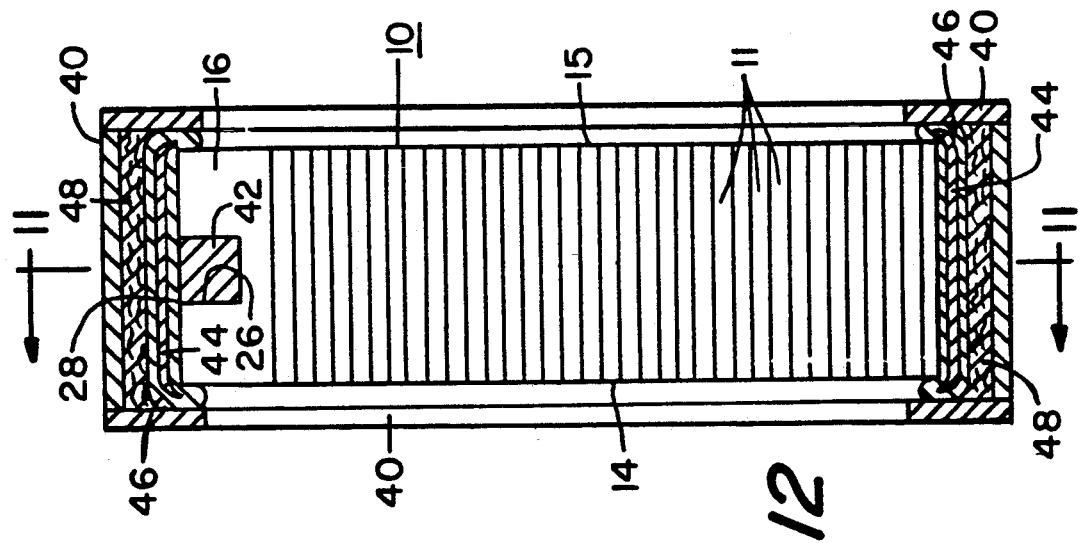
FIG. 12 is a schematic sectional view taken along line 12—12 of FIG. 11.

Referring now to FIGS. 11 and 12, a strengthening and mounting arrangement is shown which not only strengthens the heater body 10 but also facilitates its mounting within an enclosing housing 40. Similar to the embodiment shown in FIGS. 5 and 6, each slot 16 is provided with a countersunk cavity 26 adjacent its mouth 28. A short rod in the form of a spacer plug 42 is positioned within each countersunk guide hole cavity 26 and functions to not only provide the desired strengthening and improved rigidity of the slotted honeycomb structure 10, but also serves to keep the slots in an open condition and prevent contact between opposite sidewalls 18, which would result in short circuits in the electrical path between the electrodes 12. In contrast with the spacer rod 30, the short rod or spacer plug 42 only extends within the countersunk cavity 26 and does not extend inwardly of the slot 16 as does the rod 30.

In order to prevent the spacer plugs 42 from working outwardly of the countersunk cavities 26, retainer plates or locking keys 44 are positioned over the open end or mouth 28 of the slots 16, and are suitably encased within an electrical insulating ceramic fiber tape-sleeving 46, such as produced by the Minnesota Mining and Manufacturing Company under the trademark Nextel. In addition, in order to further insulate the slotted metallic honeycomb heater body 10 from the housing 40, and cushionably mount such heater against deleterious vibration, a suitable high temperature electrical insulating ceramic fiber 48 is positioned between the housing 40 and the sleeve-encased retainer plates 44. A suitable ceramic fiber, such as made from alumina and silica, is available from the Carborundum Company under the trademark Fiberfrax.

Figure 14:
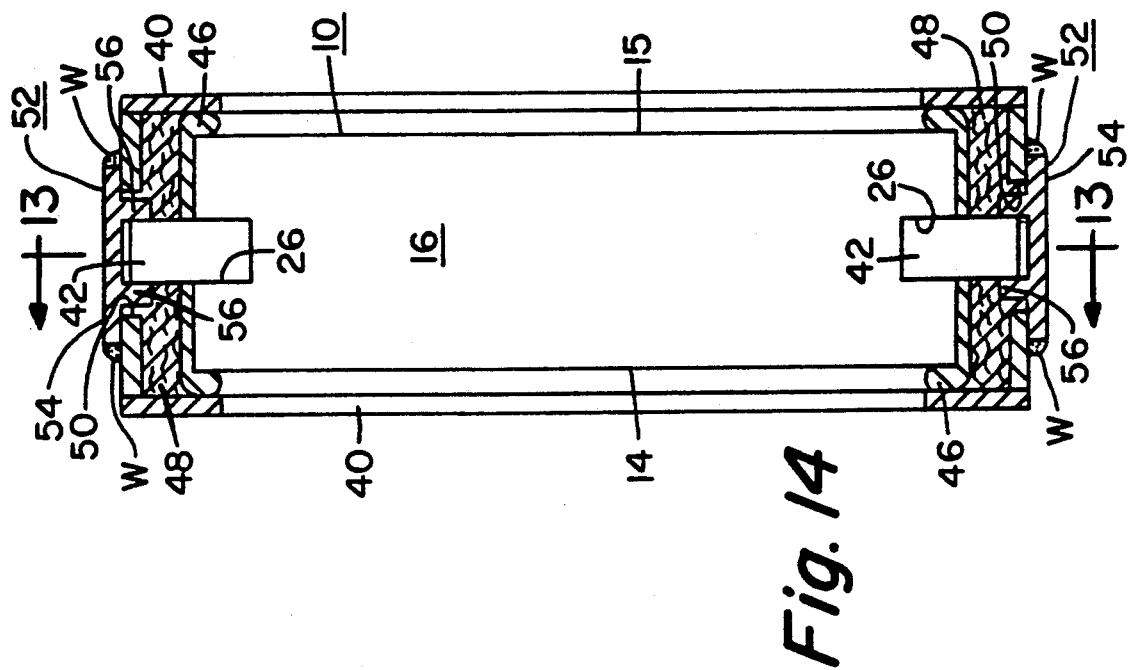
FIG. 14 is a schematic cross-sectional view as would be seen along line 14—14 of FIG. 13, were a whole structure shown.
Figure 13:
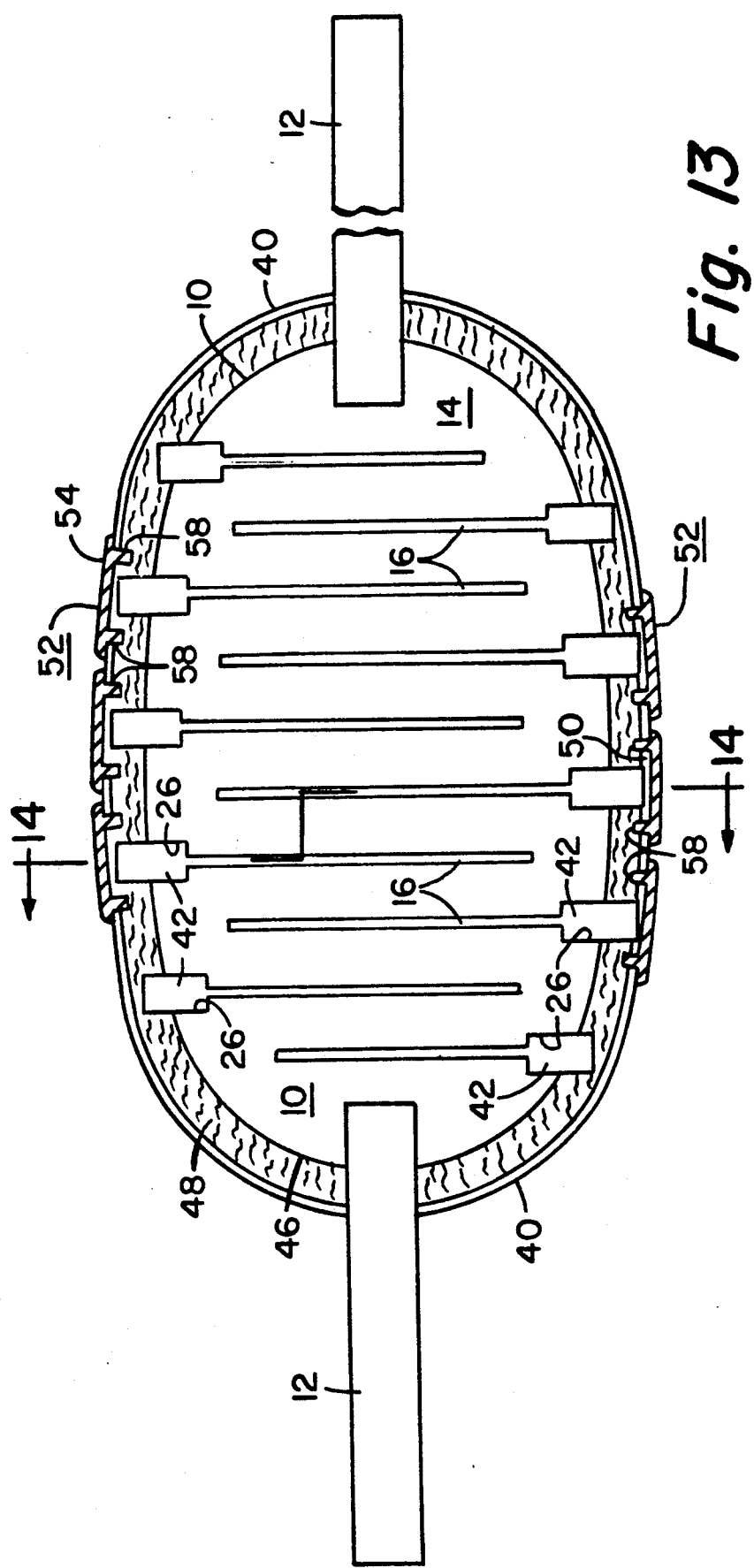
FIG. 13 is a schematic elevational view as would be seen along line 13—13 of FIG. 14, of a strengthened slotted metallic honeycomb body precision mounted within an enclosing housing.

Referring now to FIGS. 13 and 14, a preferred embodiment of strengthening and precision mounting the slotted metallic honeycomb heater structure 10 within the enclosing housing 40 is shown. The open end or mouth 28 of each slot is provided with a countersunk alignment cavity 26, similar to that shown in the embodiment of FIGS. 11 and 12. However, the short rod or spacer plug 42 not only is firmly engaged by the countersunk cavity 26, but extends or projects outwardly therefrom. The housing 40 is provided with a plurality of cutout sections or openings 50 in the area of certain of the short locking rods or spacer plugs 42. A restraining insert 52 is provided for placement in each of said cutout sections 50.

Each of the restraining inserts has an outer plate 54 which overlies the openings 50 and the adjacent area of the housing 40, and inwardly projecting side flanges 56 and end flanges 58. The opening between the side flanges 56 is machined to precisely fit the outwardly projecting locking rod or spacer plug 42 as shown in FIG. 14, which accordingly positions the slotted metallic honeycomb heater body 10 with respect to the direction of gas flow through the cells extending between the front face 14 and back face 15 of the honeycomb structure, i.e. along an axis extending perpendicular to said front and back faces. However, as shown in FIG. 13, the end flanges 58 of the restraining insert 52 are spaced-apart from the locking spacer plug 42 to allow for expansion in the orthogonal direction.

The strengthening and mounting system shown in FIGS. 13 and 14 has the unique advantage of being able to precisely mount and restrain the movement of a metallic honeycomb heater body within a standard housing construction. That is, by utilizing the cutout sections and their restraining inserts, the requirement of accurately matching areas on the heater with the housing has been eliminated. The cutout sections or openings 50 formed in the housing 40 do not require precise locations, because the precision restraining insert 52 fits loosely within the cutout 50 in the gas flow direction.

In operation, the housing 40, having cutouts 50, is first assembled with the slotted metallic honeycomb body 10 having spacer plugs 42 within the cavities 26, and then the restraining inserts 52 are positioned within cutouts 50 and installed on the locking rod or spacer plugs 42, such that the plugs 42 precisely fit within the side flanges 56 in the direction of gas flow. The restraining inserts 52 are then fastened to the housing 40, such as by welding w or other acceptable methods of joining. Since the location of the precision restraining insert 52 within the opening 50 of the housing 40 is only established after all of the parts are in place, i.e. the heater within the housing, the need for custom fitting the heater within the housing is eliminated.

It thus can be seen that the short locking rods or spacer plugs 42 not only cooperate with the countersunk guide cavities 26 to strengthen the slotted metallic honeycomb structure 10 and prevent the closing of the slots 16, but also cooperate with the precision retaining inserts 52 to precisely mount the honeycomb heater body 10 within the housing 40 in the direction of gas flow through the honeycomb cells. The short locking rods or spacer plugs 40 may be formed of the same material as the rods 20 and 30. If desired, countersunk guide cavities 26 may extend the full length of the slot 16 and locking rods 42 may extend to the slot bottom, in the same manner as hole 22 and rod 20 of FIGS. 3 and 4. Further, the metallic honeycomb heater body 10 is insulatably and cushionably mounted within the housing 40 by means of an enclosing insulating sleeve 46 and high temperature electrical insulating ceramic fiber 48 in the same manner as that shown in FIGS. 11 and 12.

Although we have set forth the now preferred embodiments of the invention, it will be apparent to those skilled in the art that various changes an modifications may be made thereto without departing from the scope and spirit of the invention as set forth in the appended claims.

We claim:

1. A honeycomb structure comprising:
    a honeycomb body having a front face, a back face and a plurality of cells extending therethrough between said front face and said back face,
    said honeycomb body having a plurality of slots formed therein between said front face and said back face and extending from at least one edge of said honeycomb body inwardly of said body and terminating inwardly of an opposite edge of the body, and
    rod means positioned within at least one of said slots for strengthening said slotted honeycomb body by inhibiting the deformation of said slot due to thermal and mechanical stresses and for preventing such slot from flexing and closing.

2. A honeycomb structure as defined in claim 1 wherein said rod means extends within said slot from said one edge to the inward termination of said slot.

3. A honeycomb structure as defined in claim 1 wherein an aperature is formed within said slot from said one edge to the inward termination of said slot, and said rod means is positioned within said aperature.

4. A honeycomb structure as defined in claim 1 wherein a countersunk cavity is formed in said slot adjacent said one edge, and said rod means has an enlarged head portion equivalent to said countersunk cavity, firmly positioned within said cavity.

5. A honeycomb structure as defined in claim 4 wherein an inward end of said rod means projects into said honeycomb body adjacent the inward termination of said slot.

6. A honeycomb structure as defined in claim 4 wherein said rod means extends through said honeycomb body and outwardly through said opposite edge thereof.

7. A honeycomb structure as defined in claim 1 wherein said rod means is in the form of a V-shape, with the converging end of the V-shape being positioned adjacent the inward termination of said slot.

8. A honeycomb structure as defined in claim 1 wherein a countersunk cavity is formed within said slot inwardly from said one edge, and said rod means is of substantially the same diameter and depth as said countersunk cavity, so as to be positioned solely therewithin.

9. A honeycomb structure as defined in claim 1 wherein said slot is provided with a countersunk cavity extending inwardly from said one edge, said rod means being of the same diameter as said countersunk cavity and being positioned therewithin but projecting outwardly thereof from said one edge, and means for engaging said outwardly projecting rod means for mounting said honeycomb structure within an enclosing housing.

10. A precision mounted and structurally strengthened slotted metallic honeycomb structure which comprises:
    a metallic honeycomb body having a front face and a back face with a plurality of slots extending inwardly from opposite edges of said body and communicating with said front and back faces so as to form a serpentine electric path between opposite ends of said body,
    countersunk cavities formed in a plurality of said slots adjacent their associated edge, housing means enclosing at least a portion of said metallic honeycomb body, precision restraining means secured to said housing means, and rod means positioned within said countersunk cavities and extending within said precision restraining means for structurally strengthening said slotted metallic honeycomb structure and for precision mounting said structure within said housing means.

11. A slotted metallic honeycomb structure as defined in claim 10 wherein said precision restraining means are positioned within openings formed in said housing means.

12. A slotted metallic honeycomb structure as defined in claim 10 wherein said precision restraining means includes flange means for precisely retaining said rod means so as to accurately position and restrain said honeycomb structure against movement along an axis extending perpendicular to its front and back faces.

13. A slotted metallic honeycomb structure as defined in claim 10 including high temperature electrical insulating ceramic fiber material positioned between said metallic honeycomb structure and said housing means.

14. A method of strengthening and mounting a slotted honeycomb structure which comprises:

positioning rod means within at least a portion of the slots of said slotted honey comb structure, for inhibiting the deformation of said slots due to thermal and mechanical stresses and for preventing such slots from flexing and closing.

15. The method of claim 14 including the steps of forming a countersunk cavity within an open edge of each of said slots and positioning said rod means therewithin.

16. The method of claim 14 including the steps of providing a housing with precision restraining means, and projecting a portion of said rod means within said restraining means.

17. The method of claim 14 including the steps of providing a housing, forming openings within said housing, positioning said honeycomb structure within said housing, positioning precision restraining inserts within said openings in said housing, projecting said rod means into said precision restraining inserts, and securely fastening said inserts to said housing.

18. The method of claim 14 including the steps of positioning said honeycomb structure within a housing, positioning a portion of said rod means within restraining insert means, and then securing said restraining insert means to said housing to accurately position said honeycomb structure within said housing.

* * * * *